United States Patent

Steele et al.

[11] Patent Number: 6,049,532
[45] Date of Patent: Apr. 11, 2000

[54] METHOD OF AND APPARATUS FOR REDUCING A POWER CONSUMPTION OF A COMMUNICATION DEVICE

[75] Inventors: Scott A. Steele, Lindenhurst; Louis J. Vannatta, Crystal Lake; Timothy P. Froehling, Palatine; William P. Alberth, Jr., Crystal Lake; Joseph F. Cramer, III, Woodstock, all of Ill.

[73] Assignee: Motorola, Inc., Schaumburg, Ill.

[21] Appl. No.: 08/866,541

[22] Filed: May 30, 1997

[51] Int. Cl.⁷ .................................................. G08C 17/00
[52] U.S. Cl. ........................... 370/311; 455/38.3; 455/574
[58] Field of Search ...................... 370/311, 310, 370/313, 314, 328, 331, 336, 337, 341, 344, 347, 350, 345, 277, 278, 280, 282, 294, 299, 304, 329; 455/407, 408, 434, 436, 511, 515, 525, 76, 77, 574, 422, 425, 32.1, 38.3, 73, 573, 84, 550, 560, 563

[56] References Cited

U.S. PATENT DOCUMENTS

| | | | |
|---|---|---|---|
| 4,312,074 | 1/1982 | Pautler et al. | 246/430 |
| 5,140,698 | 8/1992 | Toko | 455/76 |
| 5,175,874 | 12/1992 | Auchter | 455/574 |
| 5,224,152 | 6/1993 | Harte | 455/574 |
| 5,383,221 | 1/1995 | Akita et al. | 455/436 |
| 5,436,906 | 7/1995 | Kasuya et al. | 370/347 |
| 5,539,730 | 7/1996 | Dent | 370/280 |
| 5,594,735 | 1/1997 | Jokura | 370/337 |
| 5,636,243 | 6/1997 | Tanaka | 370/347 |
| 5,708,441 | 1/1998 | Kanai | 342/359 |
| 5,784,690 | 7/1998 | Maki et al. | 455/127 |
| 5,898,929 | 4/1999 | Haartsen | 370/340 |

OTHER PUBLICATIONS

US Patent Application Serial No. 08/580,871, Attorney Docket No. CE01238R–Otting, et al., Motorola, Inc., filed Dec. 29, 1995.

US Patent application Serial No. 08/565,352, Attorney Docket No. CE01203R–Johnson, Robert Michael, Jr., Motorola, Inc., filed Nov. 30, 1995.

*Primary Examiner*—Dang Ton
*Assistant Examiner*—Phirin Sam
*Attorney, Agent, or Firm*—John J. Oskorep; Brian M. Mancini

[57] ABSTRACT

A mobile station (102) has electrical circuitry (301) that operates to reduce power consumption. A synthesizer (318) is tuned so that a receiver (314) receives a home radio frequency (RF) signal during a receive slot (504) of a PCH subframe (209). A controller (310) detects if an upcoming subframe has an uplink requirement and if data from the home RF signal indicates that an idle condition exists. If the upcoming subframe does not have an uplink requirement, synthesizer (318) is tuned during a long idle slot (506) of PCH subframe (209) to measure signal strengths of two peripheral RF signals. If the idle condition does exist, electrical circuitry (301) is placed into a low power mode throughout a transmit slot (508), a receive slot (512), a long idle slot (514), and a transmit slot (516).

18 Claims, 5 Drawing Sheets

— PRIOR ART —

METHOD OF AND APPARATUS FOR REDUCING A POWER CONSUMPTION OF A COMMUNICATION DEVICE

FIELD OF THE INVENTION

The present invention relates generally to reducing a power consumption of a communication device, and more particularly to reducing a power consumption of a mobile station operating in a time division multiple access (TDMA) system.

BACKGROUND OF THE INVENTION

Radio communication devices, such as mobile stations which communicate via radio frequency (RF) signals, are typically portable and powered by removable batteries. A removable battery can supply power to a communication device for a limited amount of time which is inversely proportional to an average power consumption of the device. Thus, it is often desirable to decrease the power consumption of a communication device in order to increase its operating time before the batteries are depleted. Alternatively, it is often desirable to decrease the power consumption in order to decrease the size of the removable battery that attaches to the communication device.

Intermittent receive (IRX) methods, where typically a receiver of a communication device is powered off during some portion of a receive time period, are known. However, these methods are generally more difficult to apply to devices operating in a time division multiple access (TDMA) system because of its inherent complexities. For example, a communication device operating in a TDMA system must quickly alternately receive and transmit data in adjacent time slots, and receive peripheral zone signals and measure signal strengths thereof in between such slots. Electrical circuitry of a communication device, which typically includes a receiver, a transmitter, a synthesizer, a digital signal processor, and a microprocessor, needs to be powered on for most such processing. Because of relatively slow response and settling times of electrical circuitry, it may not be practical to power off circuitry that will need to be powered on soon thereafter.

Accordingly, there is a need to reduce a power consumption of a communication device, especially a radio communication device that operates in accordance with TDMA schemes.

DETAILED DESCRIPTION OF THE PREFERRED EMBODIMENTS

According to the present invention, a method of and apparatus for reducing a power consumption of a radio communication device is disclosed. The radio communication device receives data in a first receive slot of a first subframe and detects whether an idle condition exists. In response to detecting that the idle condition exists, at least a portion of electrical circuitry of the radio communication device is powered off during a second receive slot of a second subframe.

Figure 1:
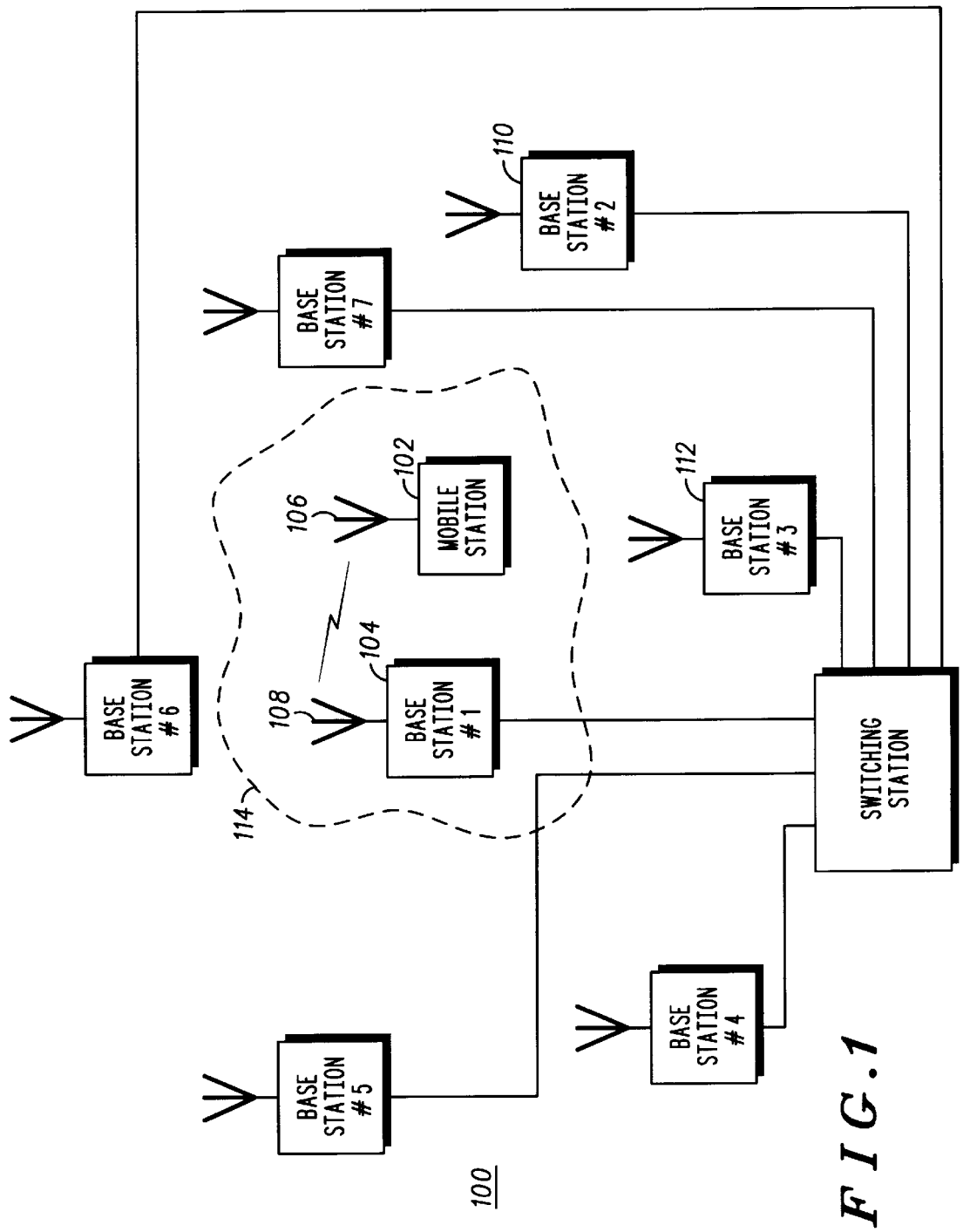
FIG. 1 is a block diagram of a radio communication system including a mobile station and a base station.

FIG. 1 is a block diagram showing a radio communication system 100. Radio communication system 100 includes a mobile station 102 and a base station 104, as well as other base stations such as base station 110 and base station 112. Mobile station 102 and base station 104 include antennas 106 and 108, respectively, and are capable of receiving and transmitting radio frequency (RF) signals for communication.

Radio communication system 100 utilizes time division multiple access (TDMA) and frequency division duplex (FDD) schemes. Preferably, radio communication system 100 is a personal digital cellular (PDC) system operating in accordance with an air interface specification issued by the Research and Development Center for Radio Systems (RCR), now known as the Association of Radio Industries and Businesses of Japan (ARIB), under the name STD-27 (RCR STD-27, 1991). Here, receive frequencies of mobile station 102 include frequencies in the range of 810–828 Mhz (PDC) and frequencies in the range of 870–885 Mhz (analog). Transmit frequencies of mobile station 102 include frequencies in the range of 915–940 Mhz (PDC) and frequencies in the range of 940–958 Mhz (analog).

Mobile station 102 and base station 104 communicate in a zone or coverage area 114. During a standby mode of operation, mobile station 102 receives a radio signal from base station 104 on a home frequency. The radio signal is modulated with control and paging data. Over time, conditions may change such that it may be more beneficial for mobile station 102 to receive the radio signal from base station 104 on a different frequency, or to receive a radio signal from a different base station on a different frequency in an adjacent zone.

For example, as mobile station 102 travels further from base station 104 and closer to base station 110, the strength of the radio signal from base station 104 may weaken while a radio signal from base station 110 at a different frequency may grow stronger. In response to such detection, mobile station 102 may initiate a "hand-off" that results in receiving the radio signal from base station 110. Such detection is made by mobile station 102 performing peripheral zone checks, where peripheral zone frequencies are continuously monitored.

Figure 2:
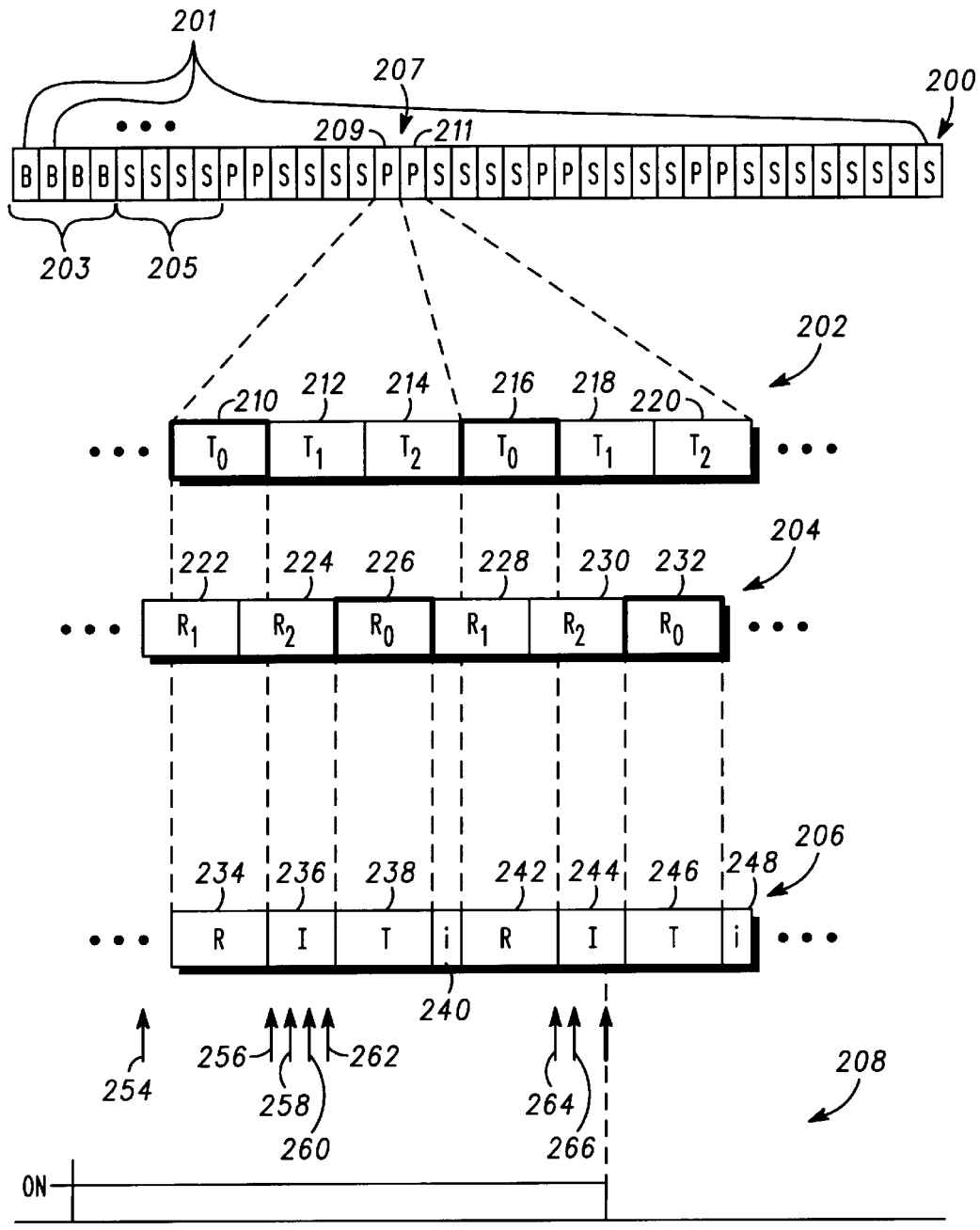
FIG. 2 shows timing diagrams related to data communication in a time division multiple access (TDMA) radio communication system.

FIG. 2 shows exemplary timing diagrams related to data communication in radio communication system 100. The timing diagrams show a superframe 200 which includes a plurality of subframes 201. The plurality of subframes 201 includes broadcast information channel (BCCH) subframes 203, signaling control channel (SCCH) subframes 205, and one or more paging channel (PCH) subframes 207 assigned to mobile station 102 and to other mobile stations. BCCH subframes 203 are downlink only and include data that describes the structure of a channel in a zone, restriction information, and peripheral zone information. SCCH subframes 205 are bidirectional (downlink and uplink) and are used for registering and setting up a call. PCH subframes 207 are downlink and include data for paging mobile stations and informing them of changes in the channel structure.

Since radio communication system 100 is also a TDMA system, base station 104 transmits data in a plurality of transmit slots 202 and receives data in a plurality of receive slots 204. Here, base station 104 is configured to receive three different messages from up to three different mobile stations. More particularly, base station 104 is configured to receive a message from mobile station 102 in receive slots 226 and 232, and is configured to receive other messages from other mobile stations in receive slots 222 and 228 and receive slots 224 and 230.

From the point of view of mobile station 102, data in PCH subframes 209 and 211 are received and transmitted in a plurality of slots 206. More particularly, data in PCH subframe 209 is received in receive slot 234 (which corresponds to transmit slot 210 of base station 104) and transmitted in transmit slot 238 (which corresponds to receive slot 226 of base station 104). Data in PCH subframe 211 is received in receive slot 242 (which corresponds to transmit slot 216 of base station 104) and transmitted in transmit slot 246 (which corresponds to receive slot 232 of base station 104). Since paging information is received therein, receive slots 234 and 242 may be referred to as "paging slots" of mobile station 102.

In between receive and transmit slots are a plurality of idle slots, which include a long idle slot 236 following receive slot 234, a short idle slot 240, a long idle slot 244 following receive slot 242, and a short idle slot 248 following transmit slot 246. Since no data is typically received or transmitted therein, long idle slots 236 and 244 and short idle slots 240 and 248 may be referred to as non-data slots. Where no uplink or transmit requirement is necessary, transmit slots 238 and 246 may also be referred to as non-data slots since no data transmission is necessary.

Receive slots 234 and 242 and transmit slots 238 and 246 are typically 6.67 milliseconds in duration, long idle slots 236 and 244 are typically 5.6 milliseconds in duration, and short idle slots 240 and 248 are typically 1 millisecond in duration. Therefore, each subframe is typically 20 milliseconds in duration. In addition, since there are typically 36 subframes per superframe 200, superframe 200 is typically 720 milliseconds in duration.

In a conventional system, base station 104 configures the system such that only a single PCH subframe (such as PCH subframe 209) is used for paging communication, where a receiver of mobile station 102 can be powered on for a minimal amount of time. During high usage, however, base station 104 may instruct mobile station 102 to receive a paging message in multiple PCH subframes, such as PCH subframe 209 and PCH subframe 211, to allow all of the paging information to be broadcast in a timely fashion. As shown in FIG. 2, base station 104 may send a PCH or paging message to mobile station 102 in transmit slots 210 and 216 (receive slots 234 and 242 of mobile station 102), and may send other paging messages to other mobile stations in transmit slots 212 and 218 and transmit slots 214 and 220. As is known in a PDC system, a single paging message may consist of data received in a first and a second receive slot, where the data in the first receive slot is different from the data in the second receive slot. When no paging information is available, base station 104 sends an idle message in PCH subframes 207. In a PDC system, an idle message is detected when a W-bits field of a PCH or paging message has a value of zero.

It is generally undesirable for a mobile station to reconfigure and change the number of receive slots it must receive PCH messages. Radio communication system 100 may require additional paging slots to increase real time paging capacity only for a short amount of time. This unnecessarily increases the current drain of a mobile station by forcing it to power up circuitry longer for receiving during the extra paging slots.

Using conventional methods, when configured to receive two paging slots, a mobile station generally operates its electrical circuitry in accordance with a timing diagram 208 of FIG. 2. The electrical circuitry of the mobile station typically includes a receiver and a synthesizer. At a time indicated by a reference arrow 254, the synthesizer is programmed for tuning the receiver to a home frequency. Prior to the beginning of receive slot 224, the synthesizer is locked and the receiver is powered on. During receive slot 234, the receiver receives an RF signal on the home frequency and obtains data therefrom. At the beginning of long idle slot 236, and at a time indicated by a reference arrow 256, the synthesizer is programmed for tuning the receiver to a first peripheral frequency. At a time indicated by a reference arrow 258, the synthesizer is locked and the electrical circuitry measures a signal strength of a first peripheral RF signal received in the receiver. At a time indicated by a reference arrow 260, the synthesizer is programmed for tuning the receiver to the home frequency. At a time indicated by a reference arrow 262, the synthesizer is locked. During receive slot 242, the receiver is on and receives the RF signal on the home frequency and retrieves data therefrom. At the beginning of long idle slot 244, and at a time indicated by a reference arrow 264, the synthesizer is programmed for tuning the receiver to a second peripheral frequency. At a time indicated by a reference arrow 266, the synthesizer is locked and the electrical circuitry measures a signal strength of a second peripheral RF signal received in the receiver. Sometime thereafter, the receiver is powered off. The number of peripheral RF signals that can be monitored during long idle slots 236 and 244 is limited by a locking time of the synthesizer and by a need to receive data on the home frequency.

Figure 3:
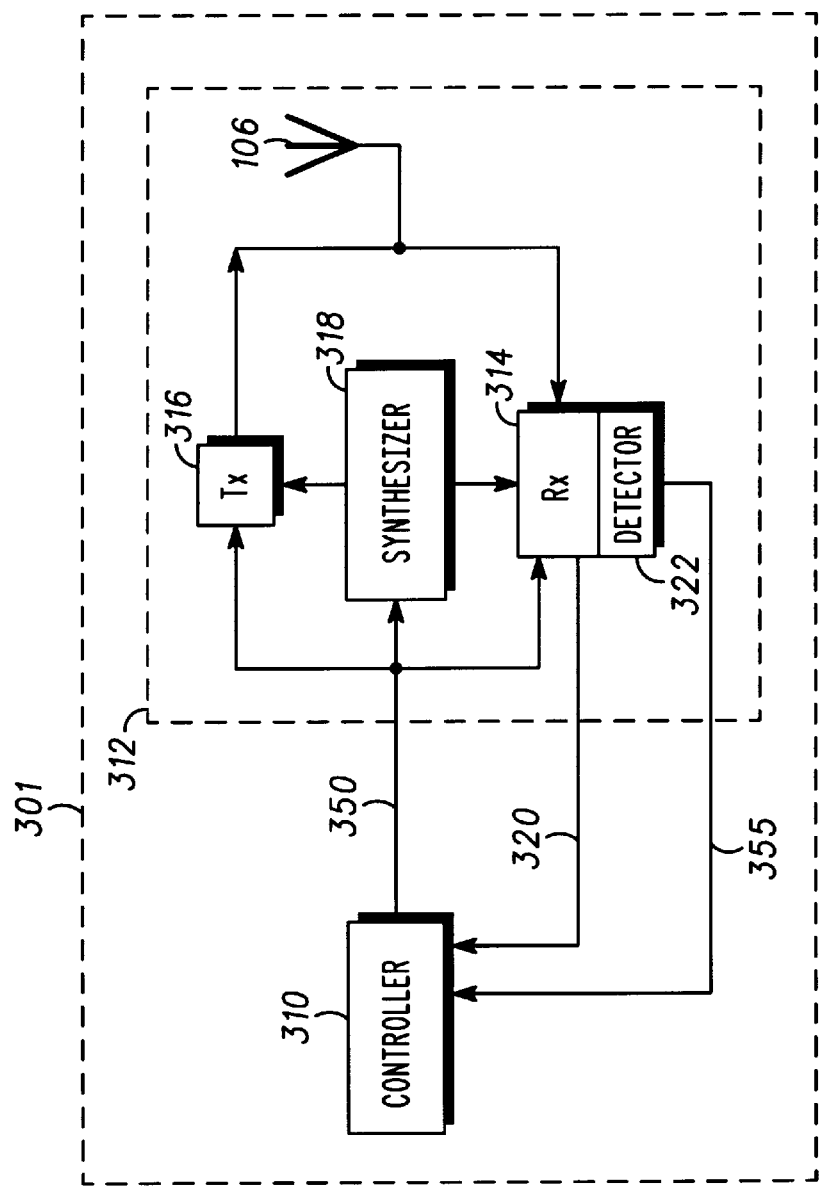
FIG. 3 is a schematic diagram of electrical circuitry of a mobile station.

FIG. 3 is a schematic block diagram showing electrical circuitry 301 of mobile station 102 operating in accordance with the present invention. Electrical circuitry 301 includes a controller 310 and a transceiver 312. Transceiver 312 includes a receiver 314, a transmitter 316, and a synthesizer 318. Synthesizer 318 generates RF signals utilized by receiver 314 and transmitter 316 for reception and transmission. Receiver 314 receives and demodulates RF signals transmitted from base station 104 and received through antenna 106, thereby generating received data which is passed to controller 310 via a connecting line 320. Controller 310 receives and interprets the received data and maintains control over transceiver 312 via a control bus 350. Controller 310 may include any suitable microprocessor(s) and memory devices. Receiver 314 includes a detector 322 which measures the quality of the received RF signals. The signal quality is passed to controller 310 via a connecting line 355. Preferably, detector 322 includes a received signal strength detector. Electrical circuitry 301 may also include other circuitry and components such as display circuitry, keypad circuitry, a speaker, a microphone (not shown). Preferably, electrical circuitry 301 is electrically powered by a removable battery (not shown) of mobile station 102.

Controller 310 has peripheral zone frequency data stored in a memory (not shown). Such data corresponds to a list of peripheral zone frequencies of radio communication system 100 regularly transmitted by base station 104 to mobile station 102. Typically, the peripheral zone frequency data includes a list of about twenty or so peripheral zone frequencies, including a first peripheral zone frequency and a second peripheral zone frequency.

Figure 4:
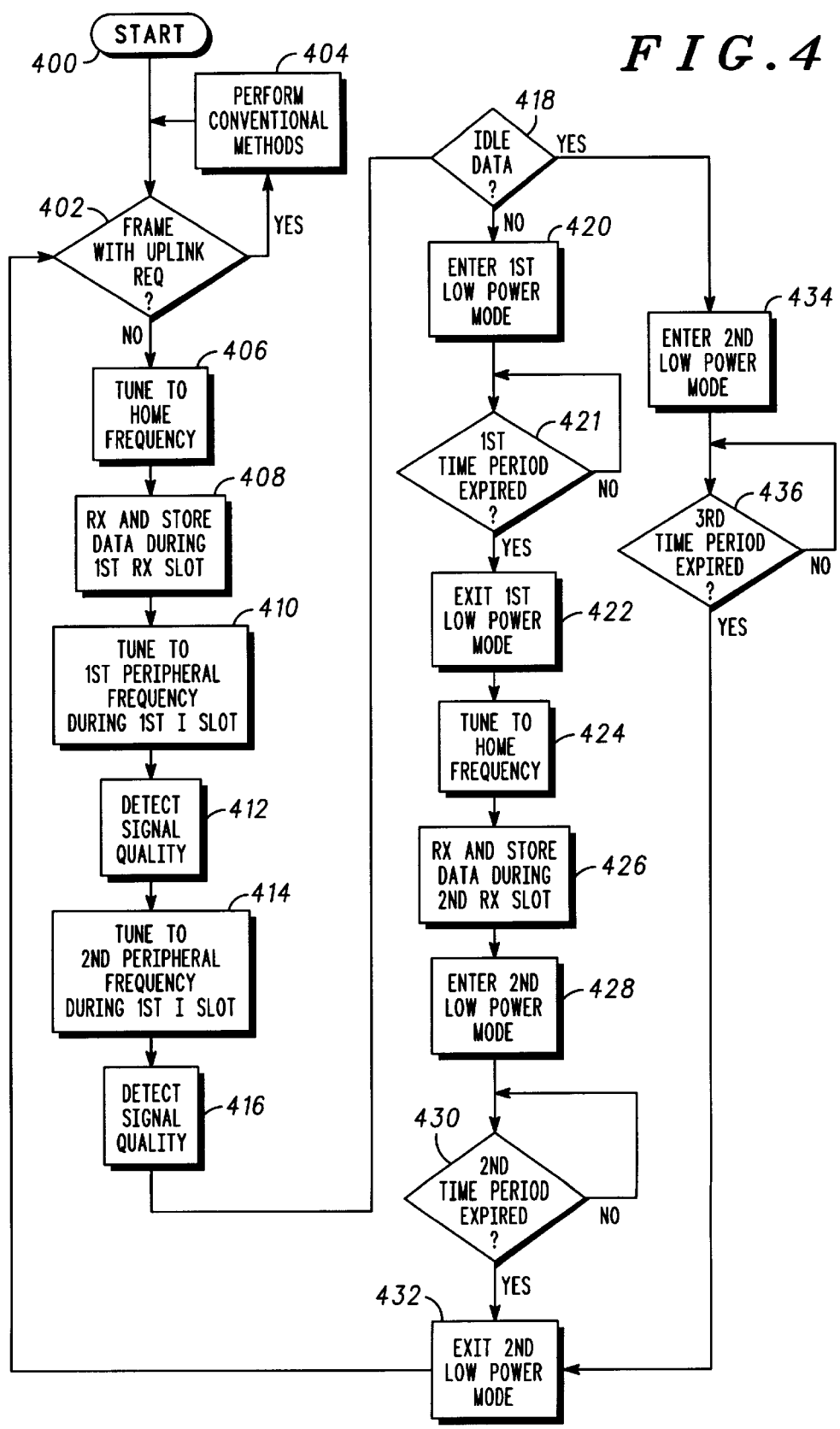
FIG. 4 is a flowchart describing a method of reducing a power consumption of the mobile station.

FIG. 4 is a flowchart describing a method of reducing a power consumption of mobile station 102. The method described here makes reference to FIGS. 2–4, as well as timing diagrams of FIGS. 5 and 6, in combination. At a start block 400, most of electrical circuitry 301 is powered on, including most electrical circuitry of controller 310, receiver 314, transmitter 316, synthesizer 318. Mobile station 102 is in a standby mode of operation and is waiting for an incoming call.

Base station 104 is configured to always transmit non-idle messages in a first subframe (such as PCH subframe 209) of PCH subframes 207 when paging information is available. Conversely, base station 104 always transmits idle messages in the first subframe (such as PCH subframe 209) when paging information is unavailable. Such predictability in message communication allows a mobile station to reduce its power consumption as described below.

Figure 5:
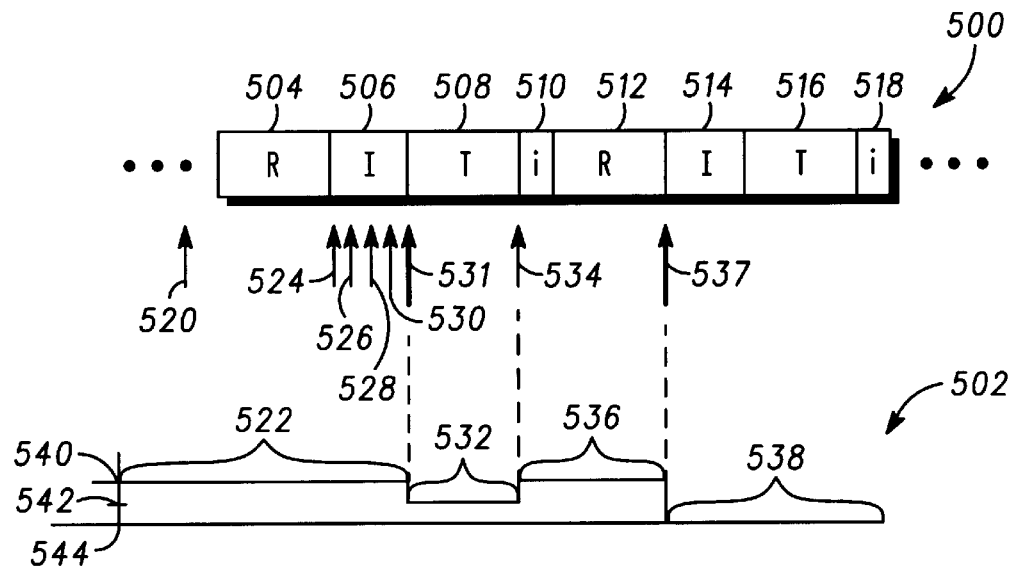
FIG. 5 is a first timing diagram showing an operation and a current consumption of the electrical circuitry.

Mobile station 102 is ready to operate in accordance with an upcoming subframe or subframes, such as PCH subframes 207 (FIG. 2), and a plurality of slots 500 (FIG. 5). The plurality of slots 500 is structured and defined in the same way as the plurality of slots 206 of FIG. 2. The plurality of slots 500 includes a receive slot 504, a long idle slot 506, a transmit slot 508, a short idle slot 510, a receive slot 512, a long idle slot 514, a transmit slot 516, and a short idle slot 518.

Controller 310 detects whether the upcoming subframe has an uplink requirement (step 402). An uplink requirement exists if data transmission must take place during transmit slots, such as transmit slots 508 and 516, of the subframe. PCH subframes 207 are typically downlinkonly subframes which provide a paging message and require no transmission by mobile station 102 in transmit slots 508 and 516. If the upcoming subframe has an uplink requirement, conventional methods are performed (step 404) as described above in relation to FIG. 2.

If the upcoming subframe does not have an uplink requirement, controller 310 sends home frequency data to synthesizer 318 through control bus 350. After a period of settling time, synthesizer 318 is tuned to the home frequency (step 406). This event occurs at a time indicated by a reference arrow 520 of FIG. 5. During receive slot 504, a modulated RF signal is received in receiver 314 and is demodulated, thereby generating received data in controller 310 (step 408). The received data is passed to and processed by controller 310.

At the beginning of long idle slot 506, controller 310 sends first peripheral frequency data to synthesizer 318 through control bus 350 at a time indicated by a reference arrow 524. After a period of settling time, synthesizer 318 is tuned to the first peripheral frequency at a time indicated by a reference arrow 526 of FIG. 5 (step 410). A first peripheral RF signal is received in receiver 314. Detector 322 detects the quality of the first peripheral RF signal by measuring a first signal strength thereof (step 412). The first signal strength is passed to controller 310 via connecting line 355 and stored in the memory of controller 310.

Next, controller 310 sends second peripheral frequency data to synthesizer 318 through control bus 350 at a time indicated by a reference arrow 528 of FIG. 5. After a period of settling time, synthesizer 318 is tuned to the second peripheral frequency at a time indicated by a reference arrow 530 of FIG. 5 (step 414). A second peripheral RF signal is received in receiver 314. Detector 322 detects the quality of the second peripheral RF signal by measuring a second signal strength thereof (step 416). The second signal strength is passed to controller 310 via connecting line 355 and stored in the memory.

Next, controller 310 detects whether an idle condition exists for receive slot 512 (step 418). In general, if a receive slot is idle, it contains no important data to receive or process. Here, controller 310 detects the idle condition based on the data earlier received in receive slot 504 and stored in the memory.

If the idle condition does not exist, electrical circuitry 301 is placed in a first low power mode (step 420) starting at a time indicated by a reference arrow 531. Here, controller 310 places synthesizer 318 into a reduced power consumption mode by sending appropriate data thereto through control bus 350. Next, controller 310 shuts down receiver 314 by sending appropriate data thereto through control bus 350. Controller 310 then places itself into a reduced power consumption mode. Controller 310 is programmed to exit the reduced power mode at time indicated by reference arrow 534.

After the expiration of a first predetermined time period (step 412), at a time indicated by reference arrow 534, electrical circuitry 301 exits the first low power mode (step 422). Controller 310 wakes up synthesizer 318 from its reduced power consumption mode by sending appropriate data thereto through control bus 350. Next, controller 310 reenables power to receiver 314 by sending appropriate data thereto through control bus 350.

The data to synthesizer 318 includes home frequency data and is sent at a time indicated by a reference arrow 534. After a period of settling time, synthesizer 318 is tuned to the home frequency (step 424). During receive slot 512, a modulated RF signal on the home frequency is received in receiver 314 and demodulated, thereby generating received data in controller 310 (step 426). At a time indicated by a reference arrow 537, controller 310 places electrical circuitry 301 into a second low power mode (step 428). In general, electrical circuitry 301 consumes less power in the second low power mode than in the first low power mode.

Controller 310 places synthesizer 318 into its reduced power consumption mode by sending appropriate data thereto through control bus 350. Next, controller 310 places receiver 314 into its reduced power consumption mode by sending appropriate data thereto via control bus 350. Next, a reference oscillator (not shown) of transceiver 312 is shut down. Shortly thereafter, controller 310 enters into its reduced power consumption mode.

At the expiration of a second predetermined time period (step 430), electrical circuitry 301 exits the second low power mode (step 432). Controller 310 repowers the reference oscillator of transceiver 312 and wakes up synthesizer 318 from its reduced power consumption mode by sending appropriate data thereto through control bus 350. Controller 310 wakes up receiver 314 from its reduced power consumption mode by sending appropriate data thereto through control bus 350. Thereafter, electrical circuitry 301 is then sufficiently powered to receive and process incoming data.

Referring back to step 418, if controller 310 detects an idle condition for receive slot 512, electrical circuitry 301 is placed in the second low power mode as described in relation to step 428 (step 434). This event occurs at a time indicated by reference arrow 531 of FIG. 6. Here, electrical circuitry 301 is placed in the second low power mode for a third predetermined time period. The third predetermined time period is generally greater than the first or the second predetermined time periods, and preferably, the next subframe is a PCH subframe of a next superframe. At the expiration of the third predetermined time period (step 436), electrical circuitry 301 exits from the second low power mode (step 432) as described above.

FIG. 5 shows a timing diagram 502 of a current consumption of electrical circuitry 301 when operating in accordance with steps 402–430 of FIG. 4 described above. Electrical circuitry 301 generally consumes a first current 540 during a time period 522 of receive slot 504 and long idle slot 506. Electrical circuitry 301 also generally consumes first current 540 during a time period 536 of receive slot 512. When in the first low power mode, electrical circuitry 301 generally consumes a second current 542 during a time period 532 of transmit slot 508. Time period 532 is representative of the first predetermined time period described above. In the second low power mode, electrical circuitry 301 generally consumes a third current 544 during a time period 538 which includes time periods of long idle slot 514, transmit slot 516, and short idle slot 518. Third current 544 is negligible in comparison to first current 540 and second current 542. Preferably, time period 538 includes a time period extending up until a subframe of a next superframe, generally a PCH subframe assigned to mobile station 102. Time period 538 is representative of the second predetermined time period described above.

Figure 6:
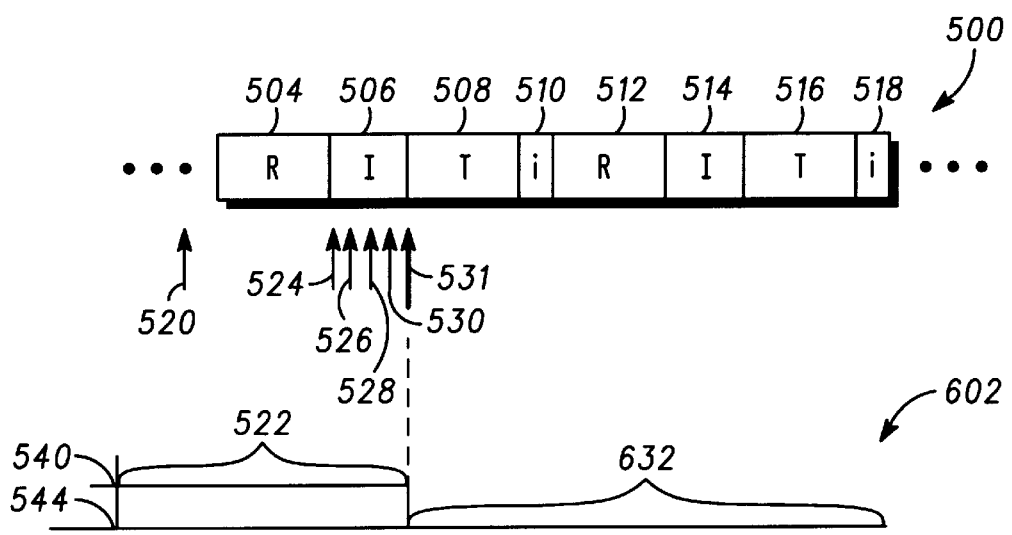
FIG. 6 is a second timing diagram showing an operation and a current consumption of the electrical circuitry.

FIG. 6 shows a timing diagram 602 of a current consumption of electrical circuitry 301 when operating in accordance with steps 402–418 and 434–436 of FIG. 4 described above. In the second low power mode, electrical circuitry 301 generally consumes third current 544 during a time period 632, which includes time periods of transmit slot 508, short idle slot 510, receive slot 512, long idle slot 514, transmit slot 516, and short idle slot 518. Preferably, time period 632 includes a time period extending up until a subframe of a next superframe, generally a PCH subframe assigned to mobile station 102. Time period 632 is representative of the third predetermined time period described above.

Although each are shown to remain fairly constant, first current 540, second current 542, and third current 544 may vary due to other operations being performed by electrical circuitry 301. For example, hardware interrupts from any keypad circuitry may cause a premature exiting from the first and the second low power modes.

Thus, we have shown a method of substantially reducing the average current drain of a mobile station while allowing a base station the flexibility of transmitting paging information on multiple paging channels. The method further allows a mobile station to continue monitoring peripheral channels equivalent to the number of paging slots assigned while decreasing the current drain of the mobile station.

While particular embodiments of the present invention have been shown and described, modifications may be made. It is therefore intended in the appended claims to cover all such changes and modifications which fall within the true spirit and scope of the invention.

What is claimed is:

1. A method of reducing power consumption of a radio communication device in a time division multiple access (TDMA) system having subframes with receive, transmit, and non-data slots, the radio communication device including electrical circuitry, the method comprising the steps of:

receiving data in a first receive slot of a first subframe;

detecting if an idle condition exists for at least a second subframe; and where an the idle condition exists for the at least the second subframe, powering off a portion of the electrical circuitry during the at least the second subframe, and where the idle condition does not exist for the at least the second subframe, powering off the portion of the electrical circuitry during at least one of the transmit and non-data slots of the at least the second subframe.

2. The method according to claim 1, wherein the detecting step includes detecting the idle condition from the data received, wherein the TDMA system is a personal digital cellular (PDC) system, and wherein the subframes are paging channel subframes.

3. The method according to claim 1, further comprising the step of:

reducing power of the portion of the electrical circuitry during at least one non-data slot of one of the first subframe and the second subframe where the idle condition does not exist.

4. The method according to claim 1, further comprising the step of:

maintaining powering off of the portion of the electrical circuitry during all subseguent subframes in a superframe where the idle condition exists.

5. The method according to claim 1, wherein the steps of powering off the portion of the electrical circuitry includes powering off portions of a receiver and a synthesizer.

6. The method according to claim 5, further comprising the steps of:

detecting whether the first subframe has an uplink requirement;

tuning the synthesizer so that the receiver is tuned to receive on a home frequency;

receiving, during the first receive slot of the first subframe, a home radio frequency (RF) signal;

tuning the synthesizer, during the first non-data slot of the first subframe, so that the receiver is tuned to receive on a first peripheral RF frequency;

receiving, during the first non-data slot, a first peripheral RF signal;

tuning the synthesizer, during the first non-data slot, so that the receiver is tuned to receive on a second peripheral RF frequency; and receiving, during the first non-data slot, a second peripheral RF signal.

7. The method according to claim 6, further comprising the steps of:

detecting a first signal strength of the first peripheral RF signal; and detecting a second signal strength of the second peripheral RF signal.

8. The method according to claim 6, wherein the detecting step includes detecting the idle condition from data received on the first home RF signal, wherein the TDMA system is a personal digital cellular (PDC) system, and wherein the subframes are paging channel subframes.

9. The method according to claim 1, wherein the first and the second subframes are part of a first superframe, and wherein during the step where the idle condition exists the method further comprises the steps of:

maintaining powering off of the portion of the electrical circuitry until a next subframe of a second superframe following the first superframe.

10. An apparatus for reducing power consumption of a radio communication device in a time division multiple access (TDMA) system having subframes with receive, transmit, and non-data slots, said apparatus comprising:

a receiver, said receiver to receive a portion of a message in a first receive slot of a first subframe;

a synthesizer, said synthesizer coupled to said receiver; and a controller, said controller coupled to said receiver and said synthesizer, said controller to detect from the portion of the message if an idle condition exists for at least a second subframe, and where the idle condition exists for the at least the second subframe the controller powers off a portion of said receiver during at least a second receive slot in response thereto, and where the idle condition does not exist for the at least the second subframe the controller powers off the portion of said receiver during at least one of a transmit and a non-data slot of the at least the second subframe.

11. The apparatus according to claim 10, wherein said controller powers off a portion of said synthesizer when the controller powers off the portion of said receiver.

12. The apparatus according to claim 10, wherein data received in at least one of the first and the second receive slots comprises the message.

13. The apparatus according to claim 10, wherein said controller to detect that the first subframe does not have an uplink requirement and to tune said synthesizer to a first peripheral frequency and a second peripheral frequency during at least a first non-data slot in response thereto.

14. The apparatus of claim 13, wherein said receiver is to receive the first peripheral radio frequency (RF) signal and the second peripheral RF signal during the at least first non-data slot, the apparatus further comprising:

a signal strength detector, said signal strength detector coupled to said receiver, said signal strength detector to measure a first signal strength of the first peripheral RF signal and a second signal strength of the second peripheral RF signal.

15. The apparatus of claim 13, wherein said receiver is to receive a home radio frequency (RF) signal during the first receive slot of the first subframe, said controller is to receive data from the home RF signal and to detect if the data is indicative of an idle condition for the second receive slot of the at least the second subframe following the first subframe.

16. The apparatus of claim 15, wherein when the controller detects an idle condition for the at least the second subframe said controller is to maintain power off for said receiver during at least one of a second non-data slot and a second transmit slot of the second subframe.

17. A time division multiple access (TDMA) radio communication system having subframes with receive, transmit, and non-data slots, comprising:

a base station, said base station configured to transmit paging messages during a plurality of subframes of a superframe, the plurality of subframes including a first subframe and a second subframe following the first subframe, the paging messages including idle messages and non-idle messages, said base station always transmitting non-idle messages in the first subframe when paging information is available, and a portable communication device comprising:

a receiver, said receiver to receive a portion of a message in a first receive slot of the first subframe;

a synthesizer, said synthesizer coupled to said receiver; and a controller, said controller coupled to said receiver and said synthesizer, said controller to detect from the portion of the message if an idle condition exists for at least the second subframe, and where the idle condition exists for the at least the second subframe the controller powers off a portion of said receiver during at least a second receive slot in response thereto, and where the idle condition does not exist for the at least the second subframe the controller powers off a portion of said receiver during at least one of a transmit and a non-data slot of the at least the second subframe.

18. The radio communication system according to claim 17, wherein said base station is part of a personal digital cellular (PDC) system.

* * * * *